Nov. 28, 1933.  F. SERRA  1,937,252

APPARATUS FOR THE REPRODUCTION OF SOUND

Filed Aug. 10, 1932

Inventor
F. Serra
by
W. E. Evans
Attorney.

Patented Nov. 28, 1933

1,937,252

UNITED STATES PATENT OFFICE 1,937,252

APPARATUS FOR THE REPRODUCTION OF SOUND

Francisco Serra, Barcelona, Spain

Application August 10, 1932, Serial No. 628,215, and in Spain March 24, 1932

3 Claims. (Cl. 179—100.3)

The present invention relates to an improvement in means for the recording and reproduction of sound in which a photographic record of the sound is made upon a film and is reproduced by causing such film to modify the passage in the direction of light-sensitive cells of light from which and by whose changes the said cells acquire electrical conductivity to a greater or lesser extent, in the manner that is already well known for example, in the case of selenium cells.

According to the invention, in utilizing films carrying photographic sound records for producing changes in the light falling on the sensitive cells so as to reproduce sounds, the said films have a plurality of images in line capable of being traversed by the light, instead of a single row as known at the present time, and mechanical and automatic means are provided for transferring the operative pencil of light from one row of images to another parallel thereto, whereby it is possible to obtain with a given length of film, reproductions of a considerable length, which will be the greater in length according as the rows of images destined to be traversed by the light are increased in number.

The invention is diagrammatically illustrated by way of example in the accompanying drawing which shows an apparatus for effecting the reproduction of sounds by the aid of a length of film which is provided with six rows of reproducing images.

Figure 6:
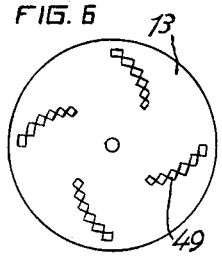
Figures 5 and 6 show details which are hereinafter described.

In the apparatus shown in Figures 1, 2, 3 and 4 the film 1 which is caused to follow a curved path at 2 and 3, is advantageously rolled upon and unrolled from two spools 4 and 5. 6 and 7 are two toothed cylinders for effecting the feed, and 8, 8' and 9, 9' are rollers for guiding the said film which slides in one or other direction over a guide screen 10 which has a transverse opening 11 for allowing the light rays coming from the projector 12 to pass in a suitable manner. Between this projector 12 and the guide screen 10 is provided an obturator consisting of an opaque disc 13 (shown in plan in Figure 6).

Figure 7:
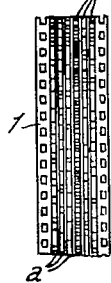
Figure 7 shows a section of transparent film with six rows of images.

14 is the selenium cell or other element sensitive to light, the electrical conductivity of which cell or element varies according to the intensities of the luminous rays which are cast upon it, after having passed through the sound images $a$ of the film 1 (Figure 7).

Figure 4:
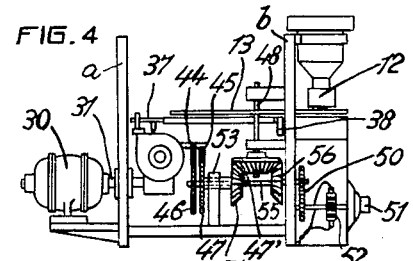
Figure 4 is a side elevation.

The spools 4 and 5 are operated by means of two pulleys 15 and 16 (Figure 2) secured on their respective axes, which pulleys are driven by means of the belts 17 and 18 fitted respectively to two other pulleys in fixed relation to the worm wheels 19 and 20 which advantageously engage with the worms 23 and 25. The toothed rollers 6 and 7 are also rotated as they have mounted on their spindles the worm wheels 21 and 22 which conveniently engage with the worms 24 and 26. The threads of the worm wheels 23 and 24 are in opposite direction to the threads of the worm wheels 25 and 26. The four worms are fitted rigidly on a spindle 27 operated by a spindle with a worm 29 which engages with a worm wheel 28 and is driven from a motor 30 by means of a spindle 31 (Figure 4). The spindle 27 is adapted to rock on the spindle 29 in such manner that when the worms 23 and 24 engage with the worm wheels 19 and 21 the worms 25 and 26 are separated from the worm wheels 20 and 22. The change in engagement between the said elements involves the changing of direction of the film in its movement over the guide screen 10.

Figure 1:
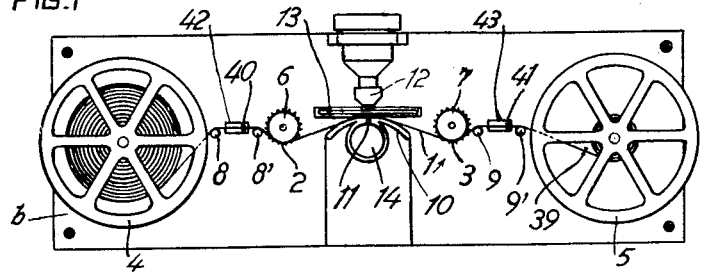
Figure 1 shows a side elevation of the apparatus on which are installed the optical system, the light projector and the light-sensitive cell.
Figure 2:
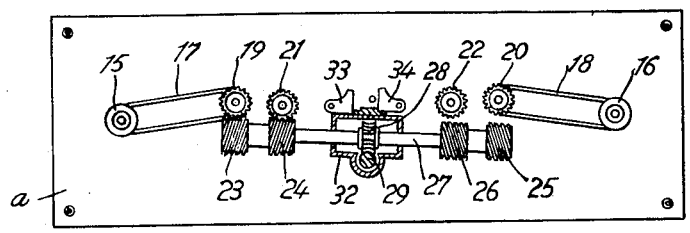
Figure 2 is a corresponding section through the part on which is mounted the mechanism for winding the film.
Figure 3:
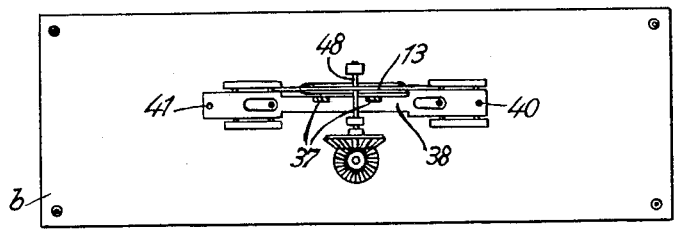
Figure 3 is a corresponding section in illustration of the means for effecting the change in direction of the movement of the film.
Figure 5:
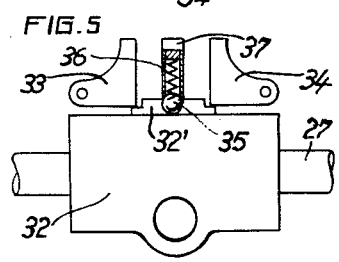

32 (Figures 2 and 5) is an oscillatory housing which serves as support for the spindle 27, and to enclose the gearing 28, 29. The housing 32 is provided at its upper part with a member 32' of such shape as to form two steps on each side, in which steps engage respectively two catches 33 and 34, and on the said housing 32 slides a ball 35 constantly pressed against it by a spring 36. This spring is supported on a projecting member 37 of the sliding bar 38 (Figure 3). When the housing 32 is in the position indicated in Figure 2, the catch 33 is engaged in the lower step on the left and the catch 34 is engaged in the upper step on the right, but if the bar 38 makes a sliding movement from left to right (Figure 3) the spring 36 and ball 35 are moved from the dead centre and pressed upon the housing 32, so as to cause it to take up an inclination in the direction opposite to that shown, the catch 33 disengaging from the lower step and the catch 34 engaging in its turn in the corresponding lower step. Thus, the spindle 27 also takes up an inclination in the opposite direction, and the worms 25 and 26 come into engagement with the worm wheels 21 and 22, whereby the direction of movement of the film 1 is changed as the inclination of the threads of the worms and worm wheels are provided to secure this effect.

The sliding movement of the bar 38 in one direction or the other is determined by the aid of two projections, such as 39 (Figure 1) secured on the film and corresponding in position to the ends of the rows of sound images of the said film. Each time one of these projections runs up against one of the contact members 40 or 41 (Figures 1 and 3) which are integral with the bar 38 and extend through the holes 42 and 43, a sliding movement of the bar 38 in one direction or the other is produced.

In order that the turning movement of the obturator 13 may take place always in the same direction, the spindle 53 of the bevel wheel 54 is provided tubular and is traversed by the spindle 55 of the other bevel wheel 56, the two wheels 54 and 56 engaging at opposite positions with the wheel 47' mounted in the spindle 48 on which is carried the obturator 13. The spindles 53 and 55 respectively carry fixedly mounted the ratchet wheels 47 and 46 which are under the action of pawls 45 and 44.

When the housing 32 oscillates, one of the catches 44 or 45 (Figure 4) is caused to move the corresponding toothed wheel 46 or 47 rotatably, and these wheels in their turn operate by means of the set of bevel gearing 47', 54 and 56, the spindle 48 on which is mounted the obturator 13. The latter is provided with four rows of orifices such as 49 (Figure 6), which are trapezoidal with circular bases and provided in such manner that not more than one orifice of a row can coincide with the opening 11 (Figure 1), the orifices being disposed in a spiral formation and the end of each coinciding with the beginning of the next in order to secure successive and ordered reproduction of the several rows of sound images of the film continuously.

Gearing 50 (Figure 4) operated by a knob 51 serves to correct the position of the obturator 13 by hand, when necessary.

In the operation of the apparatus when one of the rows of sound images provided on the film 1 has traversed the aperture 11, a projection such as 39 (Figure 1) comes to bear against, for example, the contact member 41, and this projection not being able to pass the said contact member carries the bar 38 (Figure 3) with it to the extent necessary to cause the housing 32 (Figures 2 and 5) to change position, the catch 33 ascending to the upper step from the left of the member 32', and the catch 34 descending to the lower step from the right. The rocking spindle 27 thus also changes position, and the worms 25 and 26 engage respectively with the worm wheels 20 and 22, while the worms 23 and 24 separate from the worm wheels 19 and 21. This causes the film 1 to change from one direction of movement to the opposite direction. At the same time, when the housing 32 is oscillated, one of the ratchet wheels 46 or 47 is advanced by one tooth and consequently the obturating disc 13 makes a corresponding movement of rotation, in such manner that a new orifice of the curved rows 49 comes to be disposed in register with the orifice 11 and it is this opening which permits light coming from the projector 12 to pass through a new row of sound impressions on the film 1, to act on the sensitive cell 14.

By suitably combining the elements it follows that when the passage of one of the rows of images of the film 1 beneath the opaque disc 13 is ended the direction of movement of the said film automatically changes, and that the next orifice of the row 49 comes to rest on the opening 11 so that the light rays which traverse it pass through the succeeding row images of the film 1, this operation being carried out successively until all the rows of sound images, for example, six have been utilized. The same effect is thus obtained as if a film of six times the length had been used, the changes in the row of the images being carried out without interruption of the reproduced musical parts or the like, as the mechanical operations described take place very rapidly.

In reality it would suffice to provide on the disc 13 only one of the curved rows 49, but it is preferable that there should be a complete series of orifices so that it is not necessary not to repeat the movement of the said disc 13 or to turn it through the complete revolution when each new film is brought into use.

Naturally the apparatus described must be used together with a loud speaker and amplifier to obtain sound reproduction effects.

The apparatus according to the invention comprises at 52 (Figure 4) a device which automatically cuts off the electric current, when all the rows of the sound images of the film 1 have been traversed, causing the electrical supply of the motor 30, of the projector 12, and of the cell 14 to be cut off.

It will be understood that the apparatus described may be subjected to subsidiary modifications in form and the disposition of the component parts, without affecting the essence of the invention. It can also be utilized for recording the sound images on sensitive films, for which purpose it would be sufficient to place on the projector 12 a quartz lamp operable by a microphone.

I claim:—

1. Sound reproducing apparatus employing a film carrying a plurality of rows of photographic sound images, comprising an obturator rotating always in the same direction and provided with trapezoidal orifices for the passage of light that is directed upon a light-sensitive cell, the said orifices being disposed in a spiral series upon the obturator and in juxtaposition so that the end of one orifice is coincident with the beginning of the next, whereby continuous and uninterrupted reproduction from the several rows of photographic sound images in sequence is secured.

2. Sound reproducing apparatus employing a film carrying a plurality of rows of photographic sound images, comprising an obturator rotating always in the same direction and provided with trapezoidal orifices for the passage of light that is directed upon a light-sensitive cell, the said orifices being disposed in a spiral series upon the obturator and in juxtaposition so that the end of one orifice is coincident with the beginning of the next, whereby continuous and uninterrupted reproduction from the several rows of photographic sound images in sequence is secured, a constantly rotated rocking spindle, worms carried by said rocking spindle, worm wheels for alternative engagement with the worms on the rocking spindle according to the position of the spindle, the said worm wheels respectively serving to drive the film in opposite directions, stops upon the film, a slide bar operated by said stops, a member carried by said slide bar and determining the position of the rocking spindle, and catches for retaining the rocking spindle in its determined positions.

3. Sound reproducing apparatus according to claim 2, comprising a toothed bevel wheel in fixed relation with the obturator, a pair of bevel wheels oppositely disposed and meshing with the bevel wheel of the obturator, a shaft supporting one of said bevel wheels, a sleeve concentric with said shaft supporting the second of said bevel wheels, ratchet wheels mounted upon the shaft and upon the sleeve in juxta-position, and pawls engaging said ratchet wheels and operated by said rocking spindle to effect adjustment of the position of the obturator.

FRANCISCO SERRA.